Patented Mar. 7, 1950

2,499,877

UNITED STATES PATENT OFFICE 2,499,877

EXTRACTION OF UNSAPONIFIABLES FROM WOOL GREASE

Archie B. Porter, Hewlett, N. Y., assignor to Nopco Chemical Company, Harrison, N. J., a corporation of New Jersey No Drawing. Application November 22, 1947, Serial No. 787,613

7 Claims. (Cl. 260—397.2)

This invention relates to the extraction of unsaponifiable substances from wool grease or fat.

Wool grease is an excellent source of certain sterols, especially cholesterol. These sterols do not combine with alkalies to form soaps; consequently, a common method for the concentration of such substances has involved in its preliminary stages saponification of wool grease followed by extraction of the saponified mass with a solvent for the unsaponifiable constituents thereof. Then the water-immiscible solvent layer is withdrawn from the reaction mixture and the solvent evaporated from the extract in order to recover the extracted solids. Various extraction methods are known to the prior art including that of Patent No. 2,362,605 to Yoder in which the saponified mass is treated prior to solvent extraction with a quantity of acid sufficient to convert all of the soaps into free fatty acids, but a difficult filtration operation is required in separating such acids from the sterols. Moreover, the separation is not complete and fatty acids precipitate along with the desired product during a later step when the cholesterol oxalic acid addition product is formed in isolating the cholesterol.

An object of the present invention is to provide an improved method for extracting the unsaponifiable constituents of wool grease.

A second object of the invention is to provide an improved procedure for extracting sterols from wool grease.

A third object of the invention is to provide an improved extraction method for concentrating cholesterol occurring in wool grease.

The present invention concerns saponifying wool grease with a 4 to 200 per cent excess of the alkali theoretically required for complete saponification, partially neutralizing the saponified mass with a suitable mineral acid in a quantity sufficient to reduce the pH value of the mass to that corresponding to 8.5 to 11.0 in a sample of one part of the reaction mass mixed with five parts of water and extracting the reaction mixture with a halogenated hydrocarbon solvent.

The procedure described herein possesses many advantages. It produces substantially quantitative recovery of the sterols and other unsaponifiable matter from wool grease, this being a substantial advance over the prior art. It is a simple straight-forward method of saponification with adjusted extraction conditions which does not involve any series of solvent fractionations or fractional distillation. The solvent phase separates readily from the aqueous phase of the mixture and does not contain large quantities of soaps or free fatty acids; hence no filtration is required and no difficulty is encountered in thoroughly washing the solvent extract with water. In addition, ordinary plant equipment may be utilized without corrosion difficulties since the reaction mass is never acid in nature. For some reason not yet understood, the sterols are isolated from the extract in a purer state than the extracts of the prior art when the conventional method of formation of the oxalic acid addition product and hydrolysis of said product is employed.

The present method is applicable to any form of wool grease whether crude or refined. Thus the solvent-extracted centrifugal grade and the acid-cracked grade of crude wool grease are suitable raw materials for the novel process as well as the refined or partially refined material known as neutral wool grease.

Any alkali suitable for saponifying oils or fats may be employed in the present invention. Of these, the hydroxides or carbonates of potassium and sodium are the best known for the purpose. Potassium hydroxide is preferred since it is the most chemically active of the commercially available alkalies.

Any liquid halogenated aliphatic hydrocarbon is suitable for use as the extractant here but ethylene dichloride (1.2-dichloroethane) has proven superior to all others and is greatly preferred for the purpose. Methylene chloride, chloroform, carbon tetrachloride, trichloroethylene, propylene chloride (1,2-dichloropropane), the propyl chlorides, the butyl chlorides, the amyl chlorides, the bromine analogs of the aforementioned compounds and the like may be used if desired. The solvent selected must be liquid under the extraction conditions and should preferably have a boiling point not exceeding about 120° C. in order that it can be easily evaporated off from the extracted solids.

Although not essential to the success of this process the use of a saponification catalyst, as exemplified by isopropanol, is recommended for best results. Other suitable catalysts include, inter alia, methanol, ethylene glycol, diethylene glycol, ethanol, propanol, butanol, etc. Extremely large quantities of alcohols such as isopropanol are undesirable as they promote the solubility of soaps in the solvent through a mutual solvent effect.

The acid employed for partial neutralization of the saponified mass is of importance in the practice of the present invention. By experiment it has been determined that only sulfuric, phosphoric and hydrochloric acids are capable of producing the full benefits of this invention. The reason why other mineral and lower organic and fatty acids do not provide the desired results is not completely understood. In the case of the organic acids, the separation of the solvent and aqueous phases of the reaction mass was inferior and difficulties in washing the extract with water were encountered, apparently because the solvent extract contained appreciable quantities of soap due to the poor separation. Sulfuric acid is greatly preferred as it produces higher yields of extracted solids and is considerably cheaper than phosphoric and hydrochloric acids. It is to be understood that practice of this invention is not limited to the use of a single acid for mixtures of the suitable acids provide substantially equivalent results. Similarly the solvent, alkali and wool grease may each consist of mixtures of various substances indicated above as operative.

The concentrations of the alkali and acid employed are not critical for it is necessary only that the alkali be sufficiently concentrated to saponify the wool grease. The alkali may be dissolved in any medium, as for example, water or one of the alcohols which is suitable for a saponification reaction. However, sufficient water must be introduced at some stage prior to separation of the phases of the reaction mass in order to induce clean-cut separation of the solvent phase from the soap phase. Inasmuch as sufficient water is usually present in the reaction mass prior to the partial neutralization step it is preferred to introduce the acid in a rather concentrated form. Moreover, in the case of sulfuric acid this lessens the corrosion problems in the handling of the acid.

The saponification reaction may be carried out in accordance with any of the known processes for alkali saponification provided the quantity of alkali added amounts to 104 to 300 per cent of that theoretically required for complete saponification. However using a quantity of alkali of more than about 65 per cent in excess of the theoretical requirement is wasteful of both alkali and acid and requires the handling of unnecessarily large quantities of materials. In practicing this invention the best results have been obtained with 25 to 40 per cent excess alkali.

The saponification reaction is permitted to proceed to the maximum feasible extent. Heating the reaction mass to reflux temperatures is an excellent means for speeding up this step. Then a sample of 1 part by weight of the reaction mixture is withdrawn, mixed with 5 parts by weight of water, and titrated to determine the amount of acid necessary to partially neutralize the sample to a selected value within the pH range of 8.5 to 11.0. In practice it is greatly preferred to reduce the pH to 9.5 to 10.5 in order to realize the maximum benefits of this invention. The total acid requirement for the entire saponified mass is readily calculated by multiplying the quantity of acid titrated by the number of parts by weight of the whole reaction mixture. While there is undoubtedly a variation between the pH value of the undiluted and diluted samples of the saponified mass, this difference appears to be too small to be of any importance.

At first glance it would appear that equivalent results could be achieved by directly saponifying the wool grease to a pH of 8.5 to 11.0, but this is not the case. Only a partial and unsatisfactory degree of saponification is obtained by such treatment, hence the soap content is much lower than in wool grease which has been completely saponified and then cut back with acid to the same pH. Moreover, the direct saponification requires a far longer period of time, produces a much less satisfactory separation of the solvent and aqueous phases and the yields are considerably lower.

The soap stock is very heavy and difficult to stir, so it is desirable to dilute this to a more fluid condition in order that the acid can be rapidly and easily mixed with the soap. While water or one of a variety of liquids will serve the purpose, it is preferred to add the first batch of extraction solvent at this time in order to avoid handling unnecessary materials and to avoid reducing plant capacity. However, it is desired to point out that the extractant may be added to the soap after the partial neutralization step. The best method of introducing the selected mineral acid in the amount determined as above is to pour it into the saponified mass quickly while maintaining constant agitation to insure rapid and uniform mixing.

The temperature of extraction is not critical so long as it remains below the boiling point of the solvent and above the freezing point of any essential constituent of the solvent-soap stock mass. That is, the partial neutralization method may be utilized at any feasible temperature and provide superior results over conventional extraction processes. Since heating promotes the solution of most substances, moderately elevated temperatures are preferred, so long as the solvent does not dissolve substantial quantities of soap. In the case of ethylene dichloride, the preferred extracting agent, temperatures ranging from 40 to 65° C. are recommended.

The common expedient in soap making of adding a small quantity of a salt, such as sodium chloride, appears to aid the separation of the phases and is accordingly recommended.

After the extracting solvent has been stirred with the partially neutralized soap stock for a brief period, as for example three minutes, agitation in discontinued and the aqueous and solvent phases then form distinct layers. Next the organic solvent extract solution is removed and the extraction is repeated several times with fresh and usually smaller portions of the solvent for maximum extraction efficiency. The various extracts are then mixed and washed several times with an equal volume of water to remove any soap and other water-soluble matter in the water-immiscible extract solution. Where isopropanol is used to promote saponification, it mixes with the solvent phase and is removed for the main part by the wash water. Then the solvent is distilled off, and usually recovered for reuse, leaving a residue suitable for processing to isolate the concentrated sterols and other unsaponifiable constituents.

For a fuller understanding of the nature and objects of the invention, reference should be had to the following examples which are given merely to further illustrate the invention and are not to be construed in a limiting sense, all parts given being by weight unless otherwise stated.

Example I 2000 grams of neutral (refined) wool grease having a saponification value of 100 were saponified at reflux temperatures for several hours with an aqueous solution of 274 grams of 95% potassium hydroxide in 1164 grams of water in the presence of 540 grams of 99% isopropanol as a saponification catalyst. A sample of the reaction products was withdrawn, mixed with 5 times its weight of water and titrated to determine the quantity of acid necessary to reduce the pH of the sample to 10. The amount required for the entire soap mass was calculated by multipyling the acid titrated by the ratio of the weight of the aqueous soap layer to undiluted sample and found equal to 129 grams of 96% sulfuric acid. After cooling somewhat, 6300 grams of ethylene dichloride were thoroughly mixed for about 3 minutes with the soap mass. The acid was rapidly stirred into the reaction mixture and the temperature thereof rose to 50° C. Next the mass was allowed to stand until the solvent and aqueous layers separated, whereupon the lower ethylene dichloride solution was drawn off. The soap residue at a temperature of about 50° C. was subjected to three more extractions with 3150 gram batches of fresh ethylene dichloride at about 50° C. while being vigorously agitated. Then the four extracts were combined, thoroughly washed twice with equal volumes of water and the solvent was evaporated off leaving a residue amounting to 960 grams (48% of the wool grease) of extracted material which was predominantly unsaponified matter.

Example II 400 parts by weight of a different sample of neutral wool grease having a sterol content of 13.1% and a 45% content of unsaponifiable matter were saponified with a quantity of 20% aqueous potassium hydroxide approximately 30% in excess of the alkali required for complete saponification. The saponification catalyst, proportions and reaction conditions were the same as in Example I. After the soap mass had cooled it was divided into four equal portions, each of which was the product derived from 100 parts of wool grease.

One-quarter of the sponification mass was extracted at 30° C. with thorough mixing for periods of about 3 minutes each with three successive portions of 300, 200 and 200 parts of ethylene dichloride. The extracts were combined after withdrawal, then washed with 2 batches of equal volumes of water and the solvent distilled off. Analysis on a dry basis showed that the yield of 36.2 parts of total extracted matter contained 28.45 parts of unsaponifiable matter including 7.48 parts of sterols; these figures also represent percentage yields since they were based on 100 parts of the starting material. 3.26 parts of sterols were isolated by treatment with oxalic acid and found to have a melting point of 145.5–146.0° C. These data are tabulated in Table 1 below.

Example III

Another quarter of the soap mass of Example II was processed according to the procedure set forth in that example except that the extraction was conducted at 55–60° C. All yields were improved by the warm extraction as shown by the results set forth in Table 1.

Example IV

In the treatment of a third batch of the soap of Example II, the method of Example III was repeated except that 3 parts of sodium chloride were added to the saponified mass prior to adding any ethylene dichloride. The yield on the dry basis obtained by this salting method proved to be 39.0 parts of total extracted matter which contained 33.65 parts of unsaponifiable substances containing 9.76 parts of sterols. Although the total quantity of sterols in the extract residue here was less than in Example III, it was found possible to isolate a 23% greater quantity of sterols than could be obtained from the extract residue of Example III.

Example V

The remaining fourth of the sponified products of Example II was extracted by the method of this invention along the lines indicated in Example I. The first extraction was conducted at 55° C. by adding 300 parts of ethylene dichloride followed by 4.4 parts by weight of 96% sulfuric acid, the quantity of acid being determined by titration of a sample of the soap mass. After the aqueous and solvent layers had separated, one part of sodium chloride was introduced into the reaction mixture. Two 200 part batches of ethylene dichloride were used in the succeeding extractions at the same temperature. All yields were considerably greater than those obtained in Examples II, III and IV as shown by the data in Table 1. The total quantity of sterols in the solids extracted proved to be 100%, within the limits of analytical error, of the sterol content of the wool grease.

TABLE 1

*Percent dry yields based on weight of wool grease*

| Example | II | III | IV | V |
|---|---|---|---|---|
| Extraction Method | Cold | Warm | Warm Salting | Partial Neutralization. |
| Total Extracted Solids | 36.2 | 40.0 | 39.0 | 51.6. |
| Unsaponifiables Extracted | 28.5 | 36.8 | 33.7 | 45.1. |
| Sterols Extracted [1] | 7.48 | 10.55 | 9.76 | 13.65. |
| Sterols Isolated [2] | 3.26 | 4.18 | 5.15 | 5.80. |
| Melting Point of Sterols Isolated, °C | 145½–146 | 145½–147 | 145–145½ | 144½–145½. |

[1] As determined by precipitation with digitonin.
[2] By the oxalic acid method.

From the results obtained in the comparative experiments in Examples II through V, it is apparent that the process of the present invention procures greatly improved yields of both unsaponifiable matter and sterols over conventional extraction methods. It is also evident upon comparing the results of Examples IV and V, that the improved results are not merely derived from the salt produced by partially neutralizing the alkali with an acid.

*Example VI*

1000 grams of solvent-extracted (crude) wool grease containing 14.1% sterols and 32.0% other unsaponifiables and having a saponification number of 98 were saponified in the presence of 268 grams of 99% isopropanol with 139 grams of flake potassium hydroxide dissolved in 532 grams of water by refluxing for 2 hours. To reduce the pH to approximately 10, 3000 grams of ethylene dichloride and 19.2 grams of 96% sulfuric acid were poured rapidly into the soap. All extractions were conducted at 55° C. with stirring for 3 minutes. After separating the initial extract, three more extractions with fresh 1260 gram portions of ethylene dichloride were made. The 4 extracts were combined, washed three times with approximately equal volumes of water and the solvent was distilled off. The extract residue amounted to 456.5 grams and was found to contain about the same amount of sterols as similarly processed extract residues from neutral wool grease; however, the 5.01% yield of sterols isolated based on the crude wool grease indicated a lower availability of sterols than in the case of neutral wool grease.

*Example VII*

In the presence of 512 grams of 99% isopropanol, 2000 grams of the neutral wool grease of Example II were saponified by stirring at reflux temperature for 2 hours with 277 grams of flake potassium hydroxide dissolved in 1164 grams of water; then the acid requirement for a pH of 10 was determined in the manner set forth in Example I. One-sixth of the saponified mass was mixed with 750 grams of ethylene dichloride at 50° C. and 7.6 grams of 96% sulfuric acid were added rapidly. The partially neutralized mass was stirred for a few minutes and then allowed to separate. Next the solvent extract was withdrawn and the soap residue subjected to three further extractions using 625 grams of ethylene dichloride in each case. Upon concentrating the combined and water-washed extracts, the yield of dry extract residue proved to be 45.8% of the dry wool grease.

*Example VIII*

Another batch of one-sixth of the same soap mass was extracted using exactly the same procedure as in Example VII, except for substituting 6.3 grams of 85% phosphoric acid for the sulfuric acid. The yields of extracted solids in this instance was 44.0% of the wool grease.

*Example IX*

300 grams of neutral wool grease were saponified with a 40% excess of aqueous hydroxide (26% KOH) with 80 grams of 99% isopropanol present as a catalyst by refluxing the reaction mixture for 2 hours. After cooling to 55° C., a 277 gram portion of the saponified mass, this portion being derived from 136 grams of wool grease, was removed and mixed with 710 grams of ethylene dibromide (1,2-dibromoethane). The pH of the mixture was reduced to 9.5 on the basis previously described by adding 6.1 grams of 96% sulfuric acid. Good separation of aqueous and solvent phases occurred and the extraction was repeated three times using 223 gram quantities of ethylene dibromide. The extracts were washed with water and evaporated to dryness. Based on the weight of wool grease, the yield of extracted solids was 53.0% and the yield of sterols isolated by oxalic acid treatment was 6.62%. The purity of sterols obtained in this manner was somewhat below that of the products of the other examples as indicated by a lower and wider melting range.

*Example X*

A quantity of neutral wool grease amounting to 150 grams was saponified as before with 22.2 grams of flake potassium hydroxide in solution in 92 grams of water. 40 grams of 99% isopropanol were also added to the mixture which was refluxed for two hours and then cooled. The first extraction was conducted at 50° C. using 360 ml. of methylene chloride while 6.2 grams of 96% $H_2SO_4$ were being added with constant stirring over a period of 15 minutes in partially neutralizing the mass to a pH of 9.5. Separation of phases was good but somewhat slower than in the preceding examples. Three additional extractions at 50° C. were made with 400 ml. batches of methylene chloride. Then the extracts were washed, concentrated to dryness and sterols isolated in the manner set forth above. The dry solids obtained by extraction amounted to 43.5% and sterols isolated therefrom as before were 3.3% of the weight of original wool grease. Again, a lower and wider melting range showed that the sterols were of somewhat lower purity than in most of the examples.

*Example XI*

500 grams of neutral wool grease were mixed with 134 grams of 99% isopropanol and saponified with 133% of the theoretical quantity of 20% aqueous sodium hydroxide. A 50-gram sample of the saponified mass, amounting to about 5% of the total, was withdrawn, diluted with water, titrated as described before and discarded. 1510 grams of ethylene dichloride were mixed into the soap mass and 16.0 grams of 96% sulfuric acid were added with vigorous stirring to reduce the pH of the reaction mixture to 10. The break brought about by adding the acid was observed to be good. Upon standing, a clean cut separation of the aqueous and solvent layers occurred in well under 15 minutes. After drawing off the extract solution, the extraction was repeated three times with 940 gram batches of ethylene dichloride. All extractions were carried out at temperatures ranging from 50 to 55° C. Then the four extracts were combined, washed with water and concentrated to dryness yielding 201 grams of extracted solids or 42.8% based on the wool grease. Thereafter the solids were dissolved in 4 times their weight of ethylene dichloride and 24.3 grams (5.16% based on the wool grease) of sterols melting at 146–147½° C. were obtained via the oxalic acid method.

*Example XII*

Example XI was repeated exactly with the same materials except for substituting an equivalent amount of 20% aqueous potassium hydroxide for the sodium hydroxide. A good break and fast extraction were obtained. The yield of extracted solids amounted to 211 grams, or 44.7%, and 31.3 grams of sterols (M. P. 146½–148° C.), or 6.65% based on the wool grease, were isolated.

Example XII was repeated using 105, 115, 150, 200, 300 and 500% of the theoretical quantity of KOH required for saponification. In each case the saponified mass was partially neutralized to pH 10 with the proper amount of concentrated sulfuric acid. When the 500% quantity of alkali was employed, the break was poor and the separation of layers was too slow to be feasible, so this experiment was abandoned. Although good yields of extracted solids and cholesterol were obtained in all of the completed runs, the cholesterol isolated from the batch containing the 300% quantity of alkali had a melting point of 141–143° C. indicating slightly lower purity than the products of the other batches; hence it is recommended that no more than 300% of the theoretical alkali be used in the process described herein.

Additional experiments with other acids, both inorganic and organic, have shown that in practicing the present invention only hydrochloric acid may be regarded as equivalent to sulfuric and phosphoric acids from standpoints of yields and ready availability of sterols in the extract residue.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent is:

1. A method which comprises saponifying wool grease with from 104 to 300 per cent by weight of the quantity of alkali theoretically required for complete saponification, partially neutralizing the saponified mass with a mineral acid of the group consisting of sulfuric, hydrochloric and phosphoric acids in quantity sufficient to reduce the pH value of the reaction mass to that corresponding to a pH value of 8.5 to 11.0 in a sample of 1 part by weight of the aqueous soap phase of the reaction mass mixed within 5 parts by weight of water, and extracting unsaponifiable substances in the reaction mass with a halogenated aliphatic hydrocarbon solvent.

2. A method according to claim 1 in which the extracting solvent comprises ethylene dichloride.

3. A method according to claim 1 in which the mineral acid comprises sulfuric acid.

4. A method which comprises saponifying wool grease with from 125 to 140 percent by weight of the quantity of alkali theoretically required for complete saponification, partially neutralizing the saponified mass with mineral acid of the group consisting of sulfuric, hydrochloric and phosphoric acids in quantity sufficient to reduce the pH value of the reaction mass to that corresponding to a pH value of 9.5 to 10.5 in a sample of 1 part by weight of the aqueous soap phase of the reaction mass mixed with 5 parts by weight of water, and extracting the unsaponifiable substances in the reaction mass at a temperature of from 40 to 65° C. with a halogenated aliphatic hydrocarbon solvent having a boiling point below about 120° C.

5. A method according to claim 4 in which the mineral acid comprises sulfuric acid.

6. A method according to claim 4 in which the solvent comprises ethylene dichloride.

7. A method according to claim 6 and the additional steps which comprise removing the water-immiscible extract solution from the residue of the reaction mass and extracting an additional quantity of unsaponifiable substances from said residue with an additional quantity of the extracting solvent, removing the second water-immiscible extract solution from the reaction mass, washing the extract solutions with water, and evaporating the extracting solvent from the extract solutions.

ARCHIE B. PORTER.

REFERENCES CITED

The following references are of record in the file of this patent:

UNITED STATES PATENTS

| Number | Name | Date |
|---|---|---|
| 2,362,605 | Yoder | Nov. 14, 1944 |